United States Patent [19]

Ogawa

[11] Patent Number: 4,582,370
[45] Date of Patent: Apr. 15, 1986

[54] BALL SPLINE

[75] Inventor: Yohsuke Ogawa, Nagoya, Japan

[73] Assignee: Tsubakimoto Precision Products Co., Ltd., Japan

[21] Appl. No.: 645,317

[22] PCT Filed: Dec. 26, 1983

[86] PCT No.: PCT/JP83/00453
§ 371 Date: Aug. 16, 1984
§ 102(e) Date: Aug. 16, 1984

[87] PCT Pub. No.: WO84/03336
PCT Pub. Date: Aug. 30, 1984

[30] Foreign Application Priority Data

Feb. 21, 1983 [JP] Japan ................................ 58-26398

[51] Int. Cl.[4] ............................................. F16C 29/06
[52] U.S. Cl. .................................................. 308/6 C
[58] Field of Search ............... 308/3 R, 3 A, 6 R, 6 C

[56] References Cited

U.S. PATENT DOCUMENTS

| 3,808,839 | 5/1974 | Teramachi | 64/23.7 |
| 3,884,537 | 5/1975 | McCloskey | 308/6 C |
| 4,127,309 | 11/1978 | Teramachi | 308/6 C |
| 4,361,366 | 11/1982 | Uchiyama | 308/6 C |
| 4,375,305 | 3/1983 | Teramachi | 308/6 C |

FOREIGN PATENT DOCUMENTS

| 20483 | 7/1965 | Japan . |
| 35619 | 11/1975 | Japan . |
| 22208 | 7/1978 | Japan . |
| 32889 | 10/1979 | Japan . |

Primary Examiner—John M. Jillions
Assistant Examiner—David Werner
Attorney, Agent, or Firm—Howson and Howson

[57] ABSTRACT

A ball spline having an outer race (10) is provided in a cylindrical inner wall thereof with grooves (11, 11', 12, 12') of a generally semi-circular section. A retainer (20) is provided in both end portions thereof with ball turning grooves (24, 24') for turning balls between grooves for loaded and unloaded balls. Caps (40) are fitted in both end portions of the outer race (10) and are formed with ball turning grooves (41, 41'). The ball turning grooves (24, 24') of the retainer and the ball turning grooves (41, 41') of the return caps conjointly form a ball circulation path.

1 Claim, 7 Drawing Figures

BALL SPLINE

FIELD OF ART

The present invention relates to a ball spline used for industrial robots, etc. and more particularly to a ball spline having a retainer for preventing balls from falling off when an outer race and a shaft are separated from each other.

BACKGROUND ART

Devices of this type that have heretofore been known include such devices as disclosed in Japanese Patent Publications Nos. 22208/78 and 32889/79. The former device uses a retainer of an integral structure having ball turning grooves formed in end portions thereof. Assembly and disassembly are difficult because the balls must be moved into and out of the spline in the radial direction. Furthermore, the shape of an outer race is complex. The latter device is also disadvantageous in that its outer race is required to have a large wall thickness because the ball circulation paths extend radially with respect to the spline.

DISCLOSURE OF THE INVENTION

The present invention aims at overcoming the above-mentioned drawbacks of the conventional devices. It is characterized by an outer race, provided in a cylindrical inner wall thereof, with grooves of a generally semi-circular section, a retainer provided, in both end portions thereof, with ball turning grooves for turning balls between grooves for loaded and unloaded balls, and return caps which are fitted in both end portions of the outer race and which are formed with ball turning grooves, the ball turning grooves of the retainer and the ball turning grooves of the return caps conjointly forming a ball circulation path. This construction brings about various effects. For example, not only does the assembly and disassembly of the spline become easy, but also the outside diameter of the outer race can be reduced. Machining is easy because of the simple shape of the outer race. Further, in connection with the material of the retainer and the return cap, which is chosen by considering material cost, strength, ease of machining, etc., the present invention permits the use of different materials for the two parts because both are separate.

DESCRIPTION OF THE BEST MODE

Figure 1:
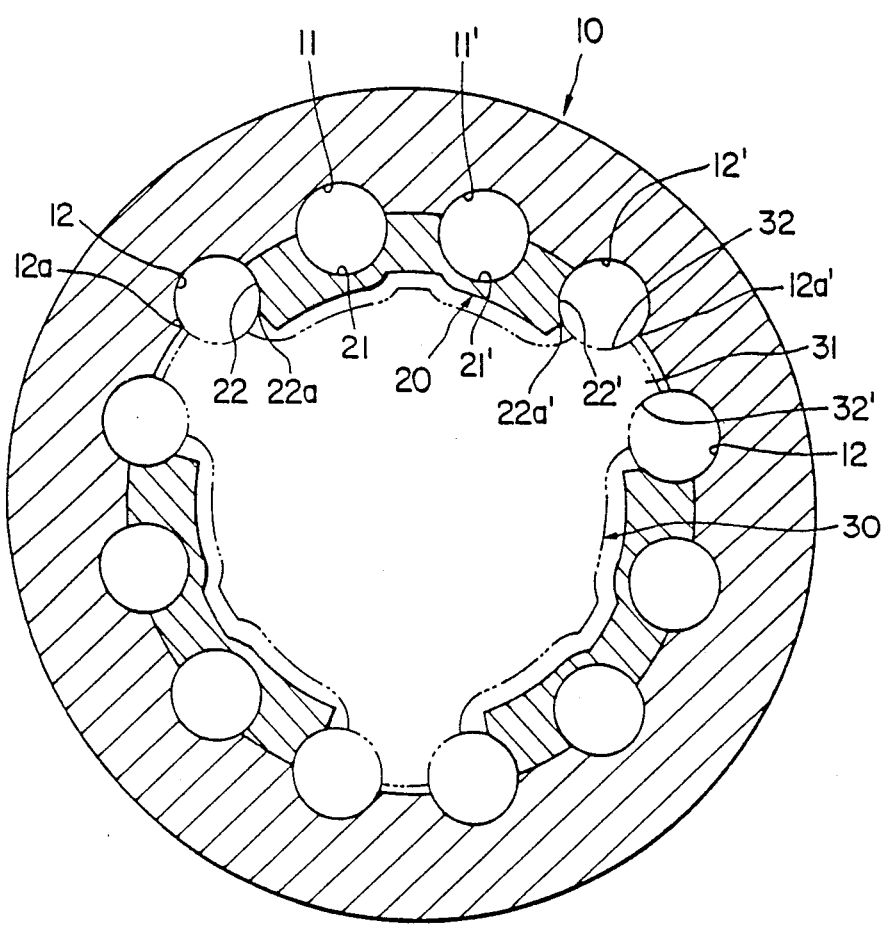
FIG. 1 is a transverse sectional view.

An embodiment of the present invention will now be described with reference to the accompanying drawings. As is clear from FIG. 1, which is a transverse section, the same structure is repeated at intervals of 120° in the circumferential direction. The reference numeral 10 denotes an outer race which has grooves for unloaded balls (ball-returning grooves) 11, 11' and grooves for loaded balls (grooves for accommodating torque transmitting balls) 12, 12'. All of these grooves are formed axially in a cylindrical inner wall of the outer race, the respective grooves 11, 11', 12 and 12' having a generally semi-circular section. The numeral 20 denotes a retainer having grooves 21 and 21' formed axially and symmetrically right and left. Grooves 21 and 21' have a generally semi-circular section of a shape complementary to grooves 11 and 11'. The retainer 20 is further provided with grooves 22 and 22', formed in both end portions thereof, for preventing balls from falling off when shaft 30 is pulled out of outer race 10. When the shaft 30 is pulled out, balls are held between end portions 12a, 12a' of grooves 12, 12' and end portions 22a, 22a' of grooves 22, 22'. Loaded balls are held during operation between grooves 32, 32' formed on both sides of an axial projection 31 of the shaft 30 and the grooves 12', 12 of the outer race 10.

Figure 2:
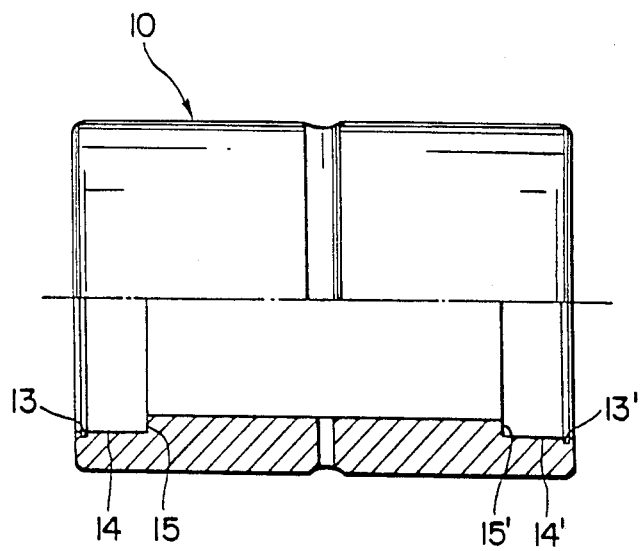
FIG. 2 is a front view of an outer race whose lower half portion is shown in section.
Figure 3:
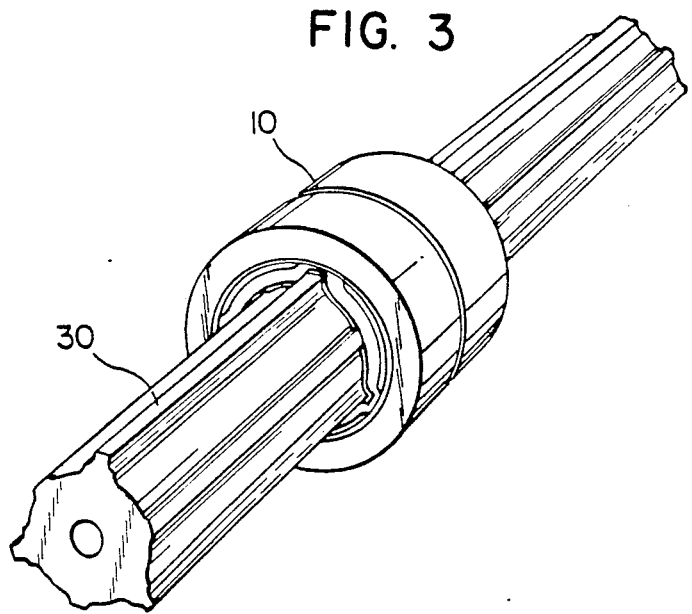
FIG. 3 is a perspective view of the entirety.

In FIG. 2, which is a front view of the outer race 10 whose lower half portion is shown in section, the numerals 13 and 13' denote grooves for retaining rings (e.g. snap rings) (not shown), and the numerals 14 and 14' denote cylindrical portions for fitting therein a return cap 40. Shoulder portions 15 and 15' fit L-shaped end portions 23 and 23' of the retainer 20, shown in FIG. 4, to hold the retainer so as to prevent its axial movement.

Figure 4:
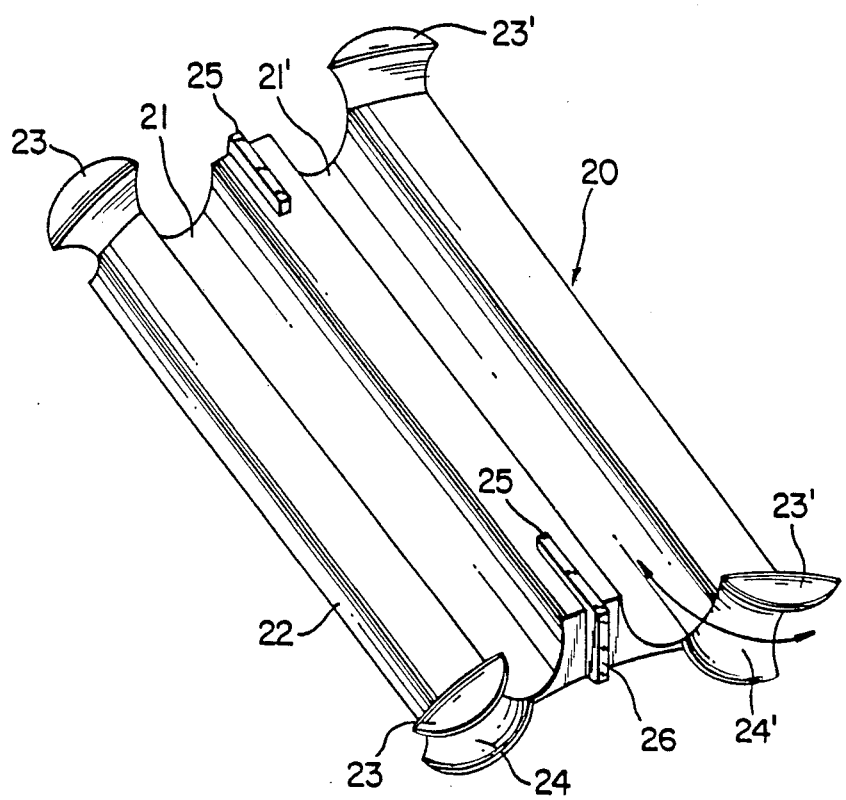
FIG. 4 is a perspective view of a retainer.
Figure 5:
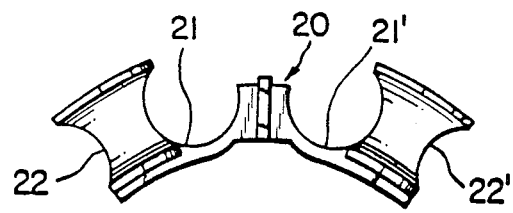
FIG. 5 is an end view thereof.

The retainer 20 is shaped as shown in FIGS. 4 and 5. End portions 23 and 23' of the retainer 20 are formed at the four corners of the retainer and are L-shaped in the radial direction. End portions 23 and 23' are engaged with shoulder portions 15 and 15' to hold the retainer 20 against axial movement as described above. The end portions 23 and 23' have grooves 24 and 24', which cooperate with grooves 41 and 41' of the return cap 40 shown in FIGS. 6 and 7 to form ball circulation paths which permit 180° changes in the direction of ball movement. The direction of movement of the balls is as indicated by arrows in FIGS. 4 and 6. The numeral 25 denotes a positioning projection adapted to fit in a groove (not shown) formed in the outer race 10, and the numeral 26 denotes a positioning projection adapted to fit in a groove formed in the return cap 40.

Figure 6:
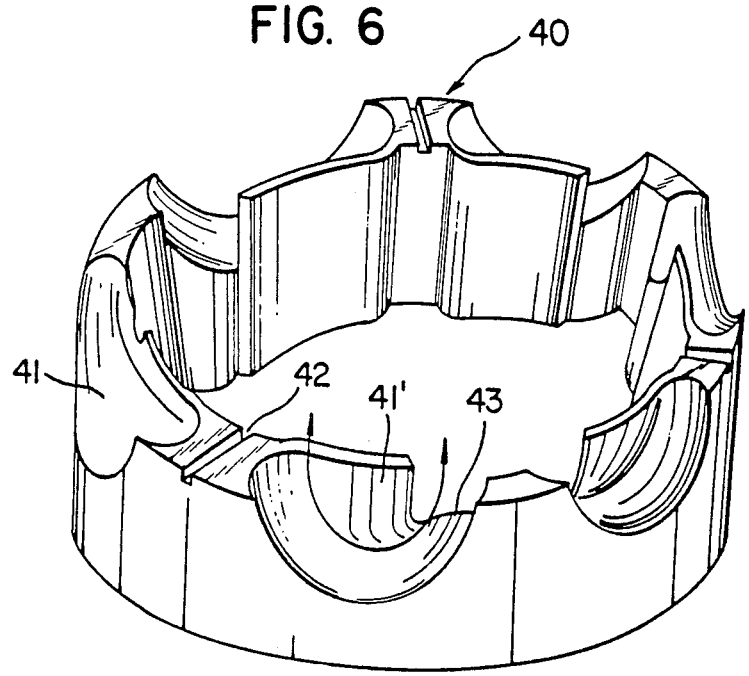
FIG. 6 is a perspective view of a return cap.
Figure 7:
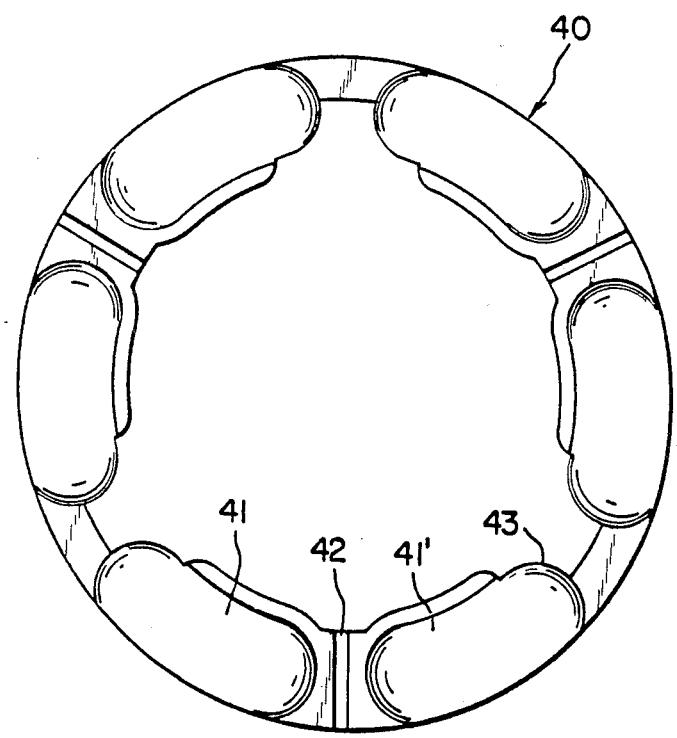
FIG. 7 is a top view thereof.

The numeral 43 in FIG. 6 denotes a tongue-like portion for effecting the transfer of balls between grooves 32, 32' and the ball turning groove 41'. The tongue-like portion is required to have a high strength.

In assembling the ball spline of the present invention, first three retainers 20 are positioned by their projections 25 and fixed to the outer race 10. Then one return cap 40 is fitted in the cylindrical portion 14 of the outer race 10, positioned with respect to retainer 20 through the projection 26 and groove 42, and fixed in place by fitting the retaining ring in the groove 13. Then, balls are inserted in the grooves from the opposite end, and the other return cap 40 is fitted in the end portion of the outer race, and then positioned and fixed with the retaining ring in the same manner as above. Thereafter, the shaft 30 may be passed through the central portion. Disassembly can be accomplished by reversing the above procedure.

Although in the above embodiment the retainer 20 is divided in three in the circumferential direction, it goes without saying that the present invention is not limited to such a mode of embodiment.

INDUSTRIAL UTILITY

Since the ball spline of the present invention can be reduced in size and improved in accuracy, it is employable in machines which require both rotational and linear motions. Particularly, it is suitable for the field of industrial robots.

I claim:

1. A ball spline having:

an outer race provided in a cylindrical inner wall thereof with axial grooves, each of said grooves being straight, having a generally semi-circular cross-section, and extending throughout its length in parallel to the axis of the cylindrical inner wall of the outer race, said grooves comprising pairs of adjacent grooves for loaded and unloaded balls respectively, the grooves of each such pair being separated by a separating portion formed on the inner wall of the outer race;

retainer means comprising means extending lengthwise along said axial grooves for retaining balls in said axial grooves and means having ball turning grooves formed at both ends of said lengthwise extending means for turning balls between grooves for loaded and unloaded balls, said means having ball turning grooves projecting radially outwardly from the ends of said lengthwise extending means and each outwardly projecting means abutting an end of one of said separating portions formed on the inner wall of the outer race; and return caps at both end portions of the outer race and formed with ball turning grooves, each of the ball turning grooves of said retainer being opposed to a ball turning groove of a return cap, whereby each of the ball turning grooves of the retainer means forms part of the inner boundary of a ball circulation path having a ball turning groove of an end cap forming part of its outer boundary.

* * * * *